US007427067B2

(12) United States Patent
Feola

(10) Patent No.: US 7,427,067 B2
(45) Date of Patent: *Sep. 23, 2008

(54) METHOD OF PLAYING A POKER-TYPE KENO GAME

(75) Inventor: John Feola, North Reading, MA (US)

(73) Assignee: New Vision Gaming & Development, Inc., North Reading, MA (US)

( * ) Notice: Subject to any disclaimer, the term of this patent is extended or adjusted under 35 U.S.C. 154(b) by 184 days.

This patent is subject to a terminal disclaimer.

(21) Appl. No.: 11/548,511

(22) Filed: Oct. 11, 2006

(65) Prior Publication Data

US 2007/0085273 A1 Apr. 19, 2007

Related U.S. Application Data

(60) Division of application No. 11/538,534, filed on Oct. 4, 2006, which is a continuation-in-part of application No. 11/430,533, filed on May 9, 2006, which is a continuation-in-part of application No. 11/317,386, filed on Dec. 22, 2005, which is a continuation-in-part of application No. 11/184,268, filed on Jul. 19, 2005.

(51) Int. Cl.
*A63F 1/00* (2006.01)
*A63F 3/06* (2006.01)
*A63F 13/00* (2006.01)

(52) U.S. Cl. ....................... 273/292; 273/274; 273/139; 273/138.2; 463/13; 463/20

(58) Field of Classification Search ................. 273/292, 273/274, 309, 139, 138.2; 463/13, 12
See application file for complete search history.

(56) References Cited

U.S. PATENT DOCUMENTS

| | | | | |
|---|---|---|---|---|
| 5,382,025 | A * | 1/1995 | Sklansky et al. | 273/292 |
| 5,494,296 | A | 2/1996 | Grassa | |
| 5,664,781 | A | 9/1997 | Feola | |
| 5,839,731 | A | 11/1998 | Feola | |
| 5,845,907 | A | 12/1998 | Wells | |
| 5,868,392 | A * | 2/1999 | Kraft | 273/292 |
| 6,379,245 | B2 | 4/2002 | De Keller | |
| 6,780,104 | B2 | 8/2004 | Fox | |
| 2004/0176154 | A1 | 9/2004 | Pinnochio | |
| 2005/0250576 | A1 | 11/2005 | Kane et al. | |
| 2005/0269775 | A1* | 12/2005 | Sorge | 273/274 |

OTHER PUBLICATIONS

Webcraft Games, Inc., Hold 'em Poker, Received in the PTO Jun. 4, 1999.*

* cited by examiner

*Primary Examiner*—Benjamin H Layno
(74) *Attorney, Agent, or Firm*—Altman & Martin; Steven K. Martin

(57) ABSTRACT

A method of playing a poker-type keno game that has a plurality of two-card, revealed, starter hands and five unrevealed community cards. A player wagers on one or more starter hands, after which the community cards are revealed. Each starter hand is combined with all of the community cards to form complete hands. The player is paid a payout amount if the highest ranked complete hand that has been wagered on is found in a pay table that corresponds to the hand. Optionally, the hands and payout amounts in the pay table are based on the odds of achieving ranked hands. Optionally, there are multiple sets of community cards.

11 Claims, 12 Drawing Sheets

| Hand | Win Frequency |
|---|---|
| 2♣ - 7♥ | 8.00% |
| 5♦ - 5♥ | 18.32% |
| Q♠ - J♠ | 27.87% |
| 8♦ - 9♦ | 21.24% |
| A♣ - K♥ | 25.39% |

FIG. 5

| Hand | Flush or Less | Full House or Better |
|---|---|---|
| 2♣ - 7♥ | 2 to 1 | 25 to 1 |
| 5♦ - 5♥ | 2 to 1 | 6 to 1 |
| Q♠ - J♠ | 2 to 1 | 3 to 1 |
| 8♦ - 9♦ | 2 to 1 | 10 to 1 |
| A♣ - K♥ | 2 to 1 | 5 to 1 |

FIG. 6

| Hand | Payout |
|---|---|
| Royal Flush | 50 to 1 |
| Straight Flush | 25 to 1 |
| Four of a Kind | 5 to 1 |
| Full House | 2 to 1 |
| Flush | 1 to 1 |

FIG. 7

| Hand | Payout |
|---|---|
| Royal Flush | 1000 to 1 |
| Straight Flush | 500 to 1 |
| Four of a Kind | 200 to 1 |
| Full House | 50 to 1 |
| Flush | 25 to 1 |
| Straight | 15 to 1 |
| Three of a Kind | 5 to 1 |
| Two Pair | 3 to 1 |
| Any Pair | 1 to 1 |

FIG. 8

| Hand | Payout |
|---|---|
| Straight Flush | 40 to 1 |
| Three of a Kind | 30 to 1 |
| Straight | 6 to 1 |
| Flush | 4 to 1 |
| Pair | 1 to 1 |

FIG. 9

| Hand | Flush or Less | Full House or Better |
|---|---|---|
| 2♣ - 7♥ | $2 | $25 |
| 5♦ - 5♥ | $2 | $6 |
| Q♠ - J♠ | $2 | $3 |
| 8♦ - 9♦ | $2 | $10 |
| A♣ - K♥ | $2 | $5 |

| Hand | Payout |
|---|---|
| Royal Flush | $100 |
| Straight Flush | $50 |
| Four of a Kind | $25 |
| Full House | $10 |
| Flush | $5 |
| Straight | $2 |
| Three of a Kind | $1 |

METHOD OF PLAYING A POKER-TYPE KENO GAME

CROSS-REFERENCES TO RELATED APPLICATIONS

The present application is a divisional application of application Ser. No. 11/538,534, filed Oct. 4, 2006 for Method of Playing a Video Poker Game, which is a continuation-in-part application of application Ser. No. 11/430,533, filed May 9, 2006 for Method of Playing a Poker-Type Keno Game, which is a continuation-in-part application of application Ser. No. 11/317,386, filed Dec. 22, 2005 for Method of Playing a Poker-Type Game, which is a continuation-in-part application of application Ser. No. 11/184,268, filed Jul. 19, 2005 for Method of Playing a Poker-Type Game.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to casino gaming, more specifically, to a card game based on Texas Hold'em poker.

2. Description of the Related Art

Texas Hold'em, a form of stud poker, has seen its popularity skyrocket as a result of various television shows that feature the game. With the popularity, many people are playing the game at home and more casinos are installing tables for the game. While watching people playing on these shows and at neighborhood gatherings, a novice to the game may feel overwhelmed and intimidated. This intimidation can take the form of feelings of embarrassment at not knowing how to play the games or not being able to play as fast or well as others, and can manifest itself by not trying the game or even in not gambling at all.

Texas Hold'em is played with a standard deck of 52 cards. The dealer deals out a hand to each player. Each hand receives two cards face down (the hole cards). The player to the left of the dealer antes an amount equal to half the minimum bet (the small blind) and the player to that player's left antes an amount equal to the minimum bet (the big blind). All players except the small and big blinds look at their hands and a round of wagering takes place, beginning with the player to the left of the big blind. After the round of wagering is complete, three community cards are dealt face up in the center of the table (the flop), followed by a second round of wagering beginning with the player to the dealer's left. After the second round, another community card is dealt face up (the turn card), followed by a third round of wagering. After the third round, the fifth community card is dealt face up (the river card), followed by the final round of wagering.

After the final round of wagering, each player turns their hole cards face up. The highest hand that can be made with any combination of a player's hole cards and the five community cards wins the pot. If two or more players have the same hand, the next highest card in each of the tied players' hands (the kicker) is used as a tie-breaker. If there is no kicker, that is, the tied players used both hole cards or have the same hand, the pot is split between them.

As is clear, many wagering choices need to be made by each player during the course of the game. For the player that is unsure of herself, this can be a cause of anxiety and intimidation, especially when playing along side people who are experienced in the game.

BRIEF SUMMARY OF THE INVENTION

It is an object of the present invention to provide a game that is suitable for use as a video poker game.

Another object is to provide a game adaptable for use as a keno-type poker game and where the player can feel comfortable learning the rules of the game for other adaptations.

Yet another object is to provide a game suitable for use in gambling based on a game where minimal knowledge of the rules of the game is necessary to play the game.

The present invention provides a game based on Texas Hold'em poker where little knowledge of the rules of Texas Hold'em poker is necessary to play. In the current implementation, there are five, revealed, two-card hands and five hidden community cards. The community cards are part of all five hands. A player wagers on one or more of the five hands to be the winning hand. Alternatively, the player must wager on all five hands. After wagering, three of the community cards are revealed. Optionally, the player must then either raise, check, or fold each hand previously wagered. The last two community cards are revealed and the winning hand is determined.

The table implementation of the game has a playing surface with a central dealer position with five card locations for each of the community cards. Player positions surround the dealer position. Each player position has a plurality of hand locations. Each hand location has a starter spot that represents the first cards of the hand and a raise spot. In one implementation, the first two cards of each hand are fixed. The consequence is that every game begins with the same five hands so that the odds of winning are known and remain the same from game to game. Also, the fixed cards are removed from the card deck. Alternatively, the first two cards of each hand are chosen randomly from the card deck.

To begin, a player selects the hand or hands that she thinks will win by placing the amount to be wagered on the wager spot of the desired hand. Alternatively, the player is required to wager on all of the hands. The dealer deals out the community cards face down in the community card locations. Since the community cards are part of every hand, the only difference between hands is the first two cards. After the first wagering round, the dealer reveals three community cards, optionally followed by a second wagering round where the player must either wager an additional amount, check, or fold each previously wagered hand. The remaining two community cards are revealed and the winning hand is determined by comparing the hands based on a predetermined criteria. Optionally, there is a third wagering round where, after the fourth community card is revealed, the player must wager an additional amount, check or fold each hand. Typically, the winning hand will be the highest ranked hand. It does not matter if no one wagered on a particular hand, it may still be the winning hand. If all of the hands are selected, the winning hand will be any hand that is found in a pay table. A player that wagered on the winning hand receives a predetermined payout according to a pay table. There may be a separate pay table for each hand. Alternatively, a player is paid a payout amount if any of the selected hands are found in a payout table.

Optionally, side bets, set jackpots, and/or progressive jackpots may be played as an adjunct to the game of the present invention. One optional side bet allows a player to wager that a particular hand will have a rank that is found in a pay table. Optionally, the hand is limited to the winning hand. Another optional side bet allows a player to wager that the hand composed only of the community cards will have a rank that is found in a pay table. Another optional side bet allows a player to wager that the hand composed only of the first three community cards, the flop, will have a rank that is found in a pay table.

The present invention contemplates that the game may be played using other media, such as scratch or pull-tab tickets, video poker-type machines, personal computers, hand-held devices, slot machines, over an on-line computer network, or on another type of one-way or interactive gaming or entertainment equipment, such as keno-style or lottery-style equipment.

For a probability scratch ticket, the ticket is produced with a number of starter hands revealed and a scratch location for the community cards. The player selects which hands to play and scratches to reveal the community cards. The player wins if she selected the winning hand or a hand in a pay table. For a traditional scratch ticket, the ticket is also produced with a number of starter hands revealed and a scratch location for the community cards. The player scratches to reveal the community cards and wins if any of the hands is in a pay table.

In the keno implementation, a video screen displays the two-card hands, a payout table for each hand, and the community cards. Typically, a player marks a slip of paper with the hands she wishes to wager on and the wager amount. A clerk accepts that slip and wager amount, then scans the slip into a terminal and gives the player a receipt indicating the hand or hands chosen for the game. Alternatively, the player many request a "quick pick," randomly chosen hands. At the appropriate time, the randomly-selected community cards are displayed, after which a player having selected a hand that has a combination shown in the corresponding payout table is a winner.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein:

FIG. 5 is a table showing the winning frequency for each of the five hands of FIG. 2;

FIG. 6 is an example pay table for hands of FIG. 2;

FIG. 7 is an example pay table for the optional seven-card bonus side bet;

FIG. 8 is an example pay table for the optional community card bonus side bet;

FIG. 9 is an example pay table for the optional flop bonus side bet;

DETAILED DESCRIPTION OF THE INVENTION

Figure 1:
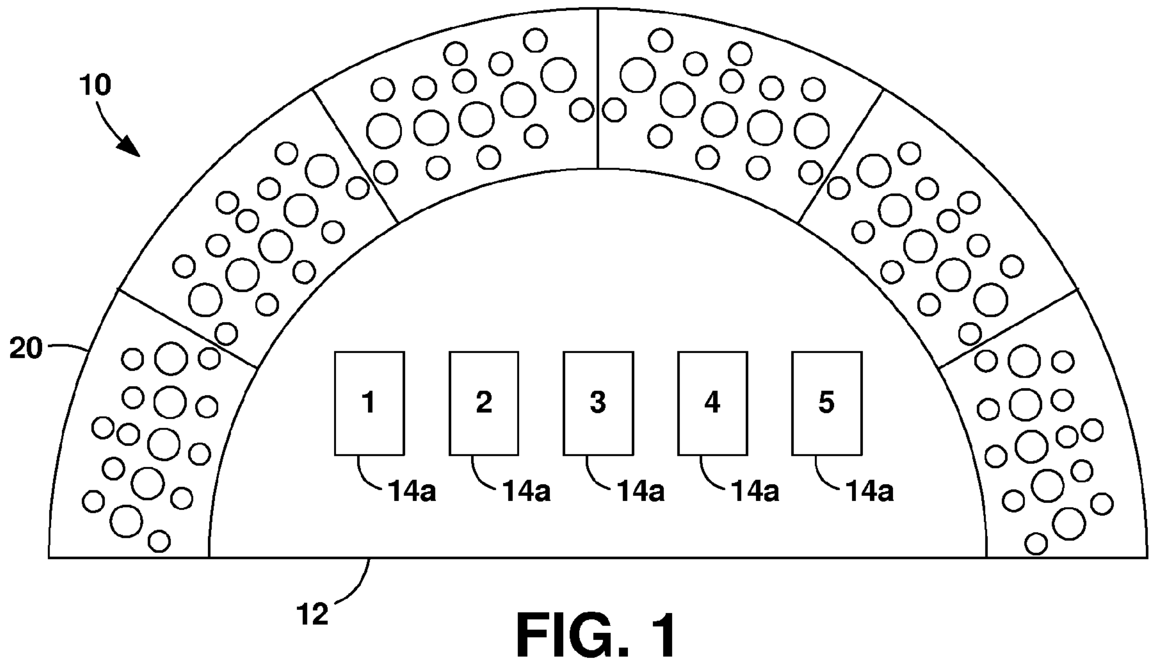
FIG. 1 shows a table layout of the game of the present invention.

The present invention provides a game based on Texas Hold'em poker where little knowledge of the rules of Texas Hold'em poker is necessary to play. The game is played with a basic set of rules and includes several optional enhancements. The essence of the game is that a player wagers on one or more hands that she hopes will be the winning hand. Because a player can wager on any hand, it is irrelevant to each player how the other players are playing the game, for example, which hands they are wagering on and how much they are wagering.

Typically, the game of the present invention is played with a standard 52-card deck of playing cards. The present invention contemplates that less than one deck or more than one deck may be used and/or that wild cards, such as jokers, may be used. In this specification, the term, "deck", refers to the total group of playing cards from which the hands can be made. In the present implementation, standard poker rankings determine winning hands.

The term "playing card" is used in the present application to indicate a playing card, a symbol representing a playing card, any facsimile thereof. For example, a playing card can be a paper playing card, a representation of a card on a table layout, an image of a card on a video display, an image of a card on a scratch ticket or bingo ball, etc. Any representation of a playing card is contemplated.

In the game as it is currently implemented, there are five hands, each having two revealed (face up) cards in a starter hand, and five hidden (face down) community cards. The five community cards are part of all five hands. In other words, each hand consists of the two starter hand cards and the five community cards. A player can wager on one or more of these five hands to be the winning hand. Optionally, the player is required to wager on all five hands. After wagering, three of the community cards are revealed. The player must then either raise or fold each hand previously wagered. The last two community cards are revealed and the winning hand is determined. Optionally, after the fourth community card is revealed, the player must raise or fold each hand, after which the fifth community card is revealed. Optionally, along with raising and folding, the player is given the option to check the hands.

Before game play begins, the house selects the rules of the game to be played, which may include such items as the number of cards and their values for the predetermined starter hands, how many hands are dealt, the order in which the cards are dealt, the ranking of hands, how the winning hand will be determined, and any side bets that are permitted. The number of hands dealt is not related in any way to the number of players, so it does not matter how many players there are in the game. There may be from two hands up to the maximum number of hands that can be made from the number of playing cards available. For a standard 52-card deck, there can be as many as 23 hands (23 two-card starter hands with five community cards).

The game is played on a playing surface, typically a tabletop, although other playing surfaces are contemplated, as described below. Example configurations of a playing surface 10 are shown in FIGS. 1-4. The playing surfaces 10 of FIGS. 1-4 are merely examples and any other playing surface configuration that provides the functionality needed to play the game of the present invention is contemplated.

The central dealer position 12 has five card locations 14*a*-14*e* (collectively, 14), one location for each of the community cards.

Figure 2:
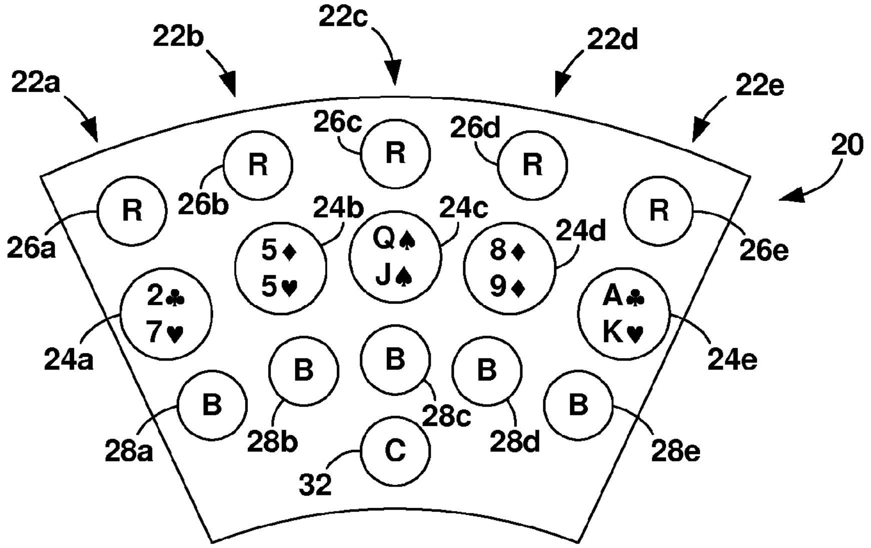
FIG. 2 shows a detail of one version of a player location of the table layout of FIG. 1.
Figure 3:
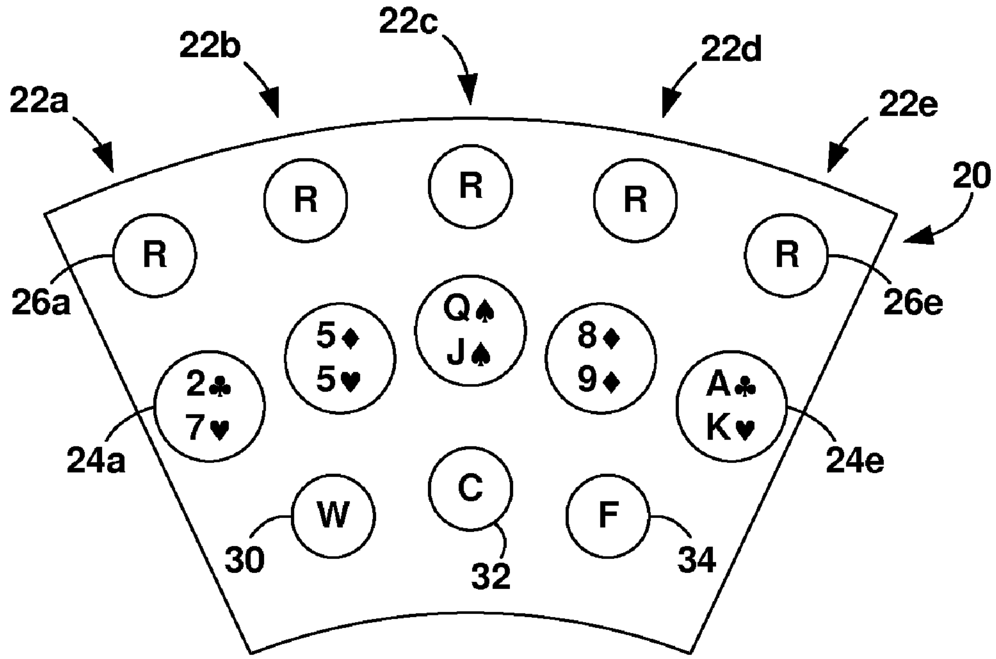
FIG. 3 shows a detail of a second version of a player location of the table layout of FIG. 1.
Figure 4:
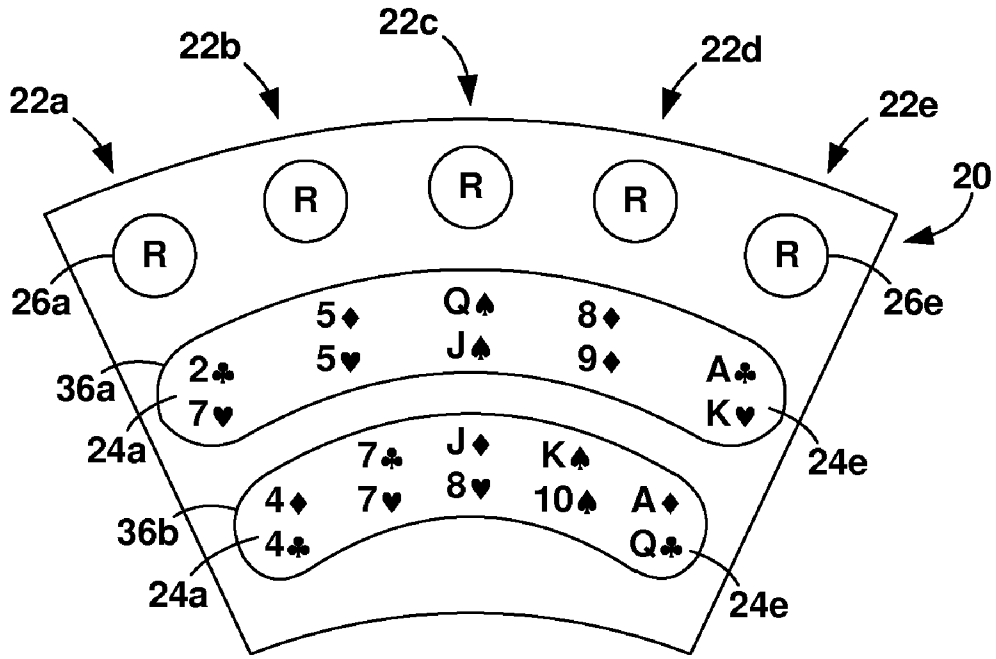
FIG. 4 shows a detail of a third version of a player location of the table layout of FIG. 1.

The dealer position 12 is surrounded by a plurality of identical player positions 20. Typically, the player positions 20 are evenly spaced in a semicircle around the dealer position 12. FIG. 1 shows six player positions 20, but because the number of players is not related to the number of hands, the number of player positions 20 may vary. Each player position 20 has a plurality of hand locations. In the example of FIGS. 2 and 3, there are five hand locations 22*a*-22*e* (collectively, 22). Each hand location 22 has a starter spot 24*a*-24*e* (collectively, 24) and a raise spot 26*a*-26*e* (collectively, 26). In the example of FIG. 4, there are two sets 36*a*, 36*b* (collectively, 36) of starter spots 24.

The starter spot 24 represents the first cards of a hand, also called the starter hand. In the present implementation, this is two cards, although the present invention contemplates one, two, three, or some other number of starter hand cards. In the present implementation, the starter hand cards are predetermined, that is, each starter hand has the same cards for every game. Optionally, to highlight this, the predetermined cards for each starter hand are printed on the playing surface. In the example of FIG. 2, hand A has a 2 of clubs and a 7 of hearts, hand B has a 5 of diamonds and a 5 of hearts, hand C 22 has a jack of spades and a queen of spades, hand D has a 9 of diamonds and an 8 of diamonds, and hand E has an ace of clubs and a king of hearts. These particular card combinations are chosen for the odds of winning that each hand represents. The win frequency for each hand, a proxy for the odds of winning, is shown in FIG. 5. The present invention contemplates that the starter hands can have any predetermined, two-card combinations. The present invention also contemplates that the starter hand cards may be chosen randomly from the deck of playing cards, as long as they are revealed to the player prior to any wagering.

In the present implementation, where the two cards of each starter hand are fixed, every game using the same playing surface begins with the same five starter hands. This means that the odds of winning are known and remain the same from game to game. A player does not have to figure out the odds of winning for each hand for every game, simplifying the game for beginners, which is one of the objects of the game.

As indicated above, the present implementation of the game is played with a standard deck of 52 playing cards. However, when implementing a version that fixes the cards of each starter hand, those fixed cards are removed from the deck so that there are no duplicates. In the example of FIG. 2, the 2 and ace of clubs, the 5, 8, and 9 of diamonds, the 5, 7, and king of hearts, and the jack and queen of spades are removed, so that there are 42 cards remaining in the deck. Optionally, the fixed cards are not removed from the deck, so there are, in effect, 62 cards, ten of which are duplicated.

To begin the game, in the examples of FIGS. 2 and 3, each player selects the hand or hands that she thinks will win. In the present implementation, the hand that ends up with the highest poker rank is the winning hand. Alternatively, the player is required to select all of the hands. Alternatively, in the example of FIG. 4, the player selects a set 36 of hands to play, where all of the hands within the set 36 are selected. In these two implementations, the highest-ranked hand found in a pay table is a winning hand. The present invention does contemplate that any criteria may determine the winning hand, for example, the lowest poker rank. The selections are made in this first round of wagering by placing the amount to be wagered on the starter spot 24 of the desired hand. The wagered amount is indicated by any marker or markers that acceptably signify value, such as cash, chips, credit vouchers, other cash equivalents, or prizes.

Before, during, or after the wagers are placed, the dealer deals out a number of community cards face down in the community card locations 14. Alternatively, one or more of the community cards may be face up. Alternatively, the community cards may be dealt out before the starter hands. The community cards are considered to be part of every hand, which means that the only difference from one hand to another is the two cards of the starter hands. In the present implementation, there are five community cards, but any number may be used.

In another embodiment of the present invention, there may be more than one set of the community cards. In one configuration of this embodiment, the player is given the opportunity to select one or more sets of community cards to wager on. Alternatively, all of the sets of community cards are combined with each of the starter hands, so that each hand that the player wagers on will actually be a wager on a plurality of hands that is the number of sets of community cards. For example, if there are three sets of community cards, each starter hand is combined with each set of community cards to form three complete hands for each starter hand. Any hand that the player wagers on will be a wager on those three complete hands.

After the first round of wagering, the dealer reveals the community cards in the first three locations 14*a*-14*c* by turning them face up. At this point, a second round of wagering takes place. For each hand that the player wagered on, the player must either wager an additional amount, check, or fold the hand. The player makes an additional wager by placing a marker in the corresponding R spot 26. In the present implementation, the additional wager is equal to the first wager. Optionally, a hand is deemed to be folded if the player does not check or raise. After this second round of wagering, the remaining two community cards 14*d*, 14*e* are revealed by turning them face up. Alternatively, rather than a second round of wagering, all of the community cards 14*a*-14*e* are revealed after the first round of wagering. Alternatively, after the second round of wagering, only the fourth community card 14*d* is revealed, the player must either wager an additional amount, check, or fold each hand, and then the fifth community card 14*e* is revealed. Alternatively, any combination of one or more community cards can be wagered on until all of the community cards are revealed. For example, a wager can be required prior to each community card being revealed.

In the present implementation, the community cards are all dealt face down before, during, or after the first round of wagering and then turned over to reveal the card value when needed during the game. Alternatively, each community card may be dealt face up as it is needed during the game.

In an alternate embodiment, one or more community cards are revealed before the player is required to select and wager on any of the hands.

The winning hand is determined by comparing the hands based on a predetermined criteria. In one implementation, that criteria includes determining which hand has the highest rank among the best five cards of each hand where, as indicated above, each hand consists of the two starter hand cards plus the five community cards. If two or more hands tie, all of the tied hands may be considered to be winning hands. It does not matter if no one wagered on a particular hand, it may still be the winning hand. A player that wagered on the winning hand is a winning player. The winning player receives a predetermined payout according to the pay table in use.

In the case where all hands are automatically selected, the winning hand is determined by comparing all of the hands to one or more pay tables. If any of the hands are in the pay table(s), the player wins.

Optionally, the payout is based on the rank of the winning hand or on the rank of any selected hand. A sample of such a pay table is shown in FIG. 6, where a player wagering on the winning hand receives a payout of 2 to 1 if the hand has a flush or lower. If the winning hand has a full house or higher, a player wagering on the winning hand receives a payout shown in the table. The payout is based on the odds that the hand will achieve the ranking. For example, the odds that hand A (2 of clubs/7 of hearts) will end up with a ranked hand are much lower than that of hand B (5 of diamonds/5 of hearts). This difference is reflected in the payout for the two hands, as can be seen in the "Full House or Better" column of the payout table of FIG. 6. The present invention also contemplates that each hand will have its own pay table independent of the others. Typically, although not required, the pay table for each hand will be based on the odds of achieving particular ranked hands from the starter hand. For example, the odds that hand A (2 of clubs/7 of hearts) will end up with a full house hand are lower than that of hand B (5 of diamonds/5 of hearts), so the corresponding payout amount for a full house is higher for hand A than for hand B.

Optionally, side bets and/or jackpots may be played as an adjunct to the game of the present invention. Those players that play the game are given the option of playing a side bet or jackpot. It is optional with the house whether or not to allow a side bet or jackpot to be played without also playing the game. Only those players who wager on a side bet before a game begins are eligible to win that side bet upon completion of the game.

A jackpot may be "set" or "progressive". In a set jackpot, the amount put into the jackpot for each game is fixed, but the fixed amount may be adjusted periodically, for example, after the jackpot is won. If more than one eligible player wins a set jackpot, each winner is paid a predetermined amount. In a progressive jackpot, the amount put into the jackpot increases for each game played during which the jackpot is not won. If more than one eligible player wins a progressive jackpot, its value is divided equally among the winners.

One contemplated bonus side bet or jackpot allows a player to wager that a particular hand will have a rank that is found in a pay table, whether or not the hand is a winning hand. If the player wishes to place this side bet, he indicates so by placing the amount to be wagered on the appropriate B spot 28*a*-28*e* of the desired hand or hands, shown in FIG. 2. The side bet is won if the rank of the hand is found in the pay table. An example pay table for this side bet is shown in FIG. 7.

Alternatively, the side bet is limited to the rank of the winning hand. If the player wishes to place this side bet, he indicates so by placing the amount to be wagered on the W spot 30, shown in FIG. 3. If the winning hand has a rank that is found in the pay table, the side bet is won. The side bet does not require that the player wager on the winning hand.

Another possible form of a bonus side bet or jackpot allows a player to wager that the hand composed only of the community cards will have a rank that is found in a pay table. If the player wishes to place this side bet, he indicates so by placing the amount to be wagered on the C spot 32, shown in FIG. 2. The side bet is won if the rank of the community cards is found in the pay table. An example pay table for this side bet is shown in FIG. 8.

Another possible form of a bonus side bet or jackpot allows a player to wager that the hand composed only of the flop will have a rank that is found in a pay table. The flop is composed of the first set of community cards that are revealed. In the present implementation, this is the first three community cards in locations 14*a*-14*c*. If the player wishes to place this side bet, he indicates so by placing the amount to be wagered on the F spot 34, shown in FIG. 3. The side bet is won if the rank of the community cards is found in the pay table. An example pay table for this side bet is shown in FIG. 9.

Optionally, the jackpots from more than one table may be linked together as a single jackpot.

The present invention contemplates that, rather than being played on a table surface with a live dealer, the game is played using other media, such as scratch or pull-tab tickets, video poker-type machines, personal computers, hand-held devices, slot machines, mobile phones and PDAs, over an on-line computer network, or on other types of one-way or interactive gaming or entertainment equipment, such as keno-style equipment, lottery-style equipment, bingo-style equipment, or multi-player video gaming equipment. Different media have different requirements as to which aspects of the game and which alternatives of the game can be implemented. Any alternative of any element of the game that can be implemented on a particular medium is contemplated by the present invention.

There are two basic types of scratch tickets, traditional tickets and probability tickets. In a traditional ticket, the ticket is determined to be a winning or losing ticket when it is printed, not when it is played. With these tickets, a player scratches off the entire ticket. The large majority of state lottery scratch tickets are of the traditional type. Since it known when the tickets are printed how many are winning tickets and the amount they will win, the total of payouts for the game (all of the tickets) is known prior to any ticket being played.

Probability tickets, on the other hand, are not predictable. With a probability ticket, the player chooses what part of the ticket to play. For example, if the ticket has five poker hands, the player chooses which ones to play. If one of the hands chosen by the player is the highest hand, the player wins. Otherwise the player loses. Consequently, a probability ticket is determined to be a winner or loser when the ticket is played, not when it is printed.

Figure 10:
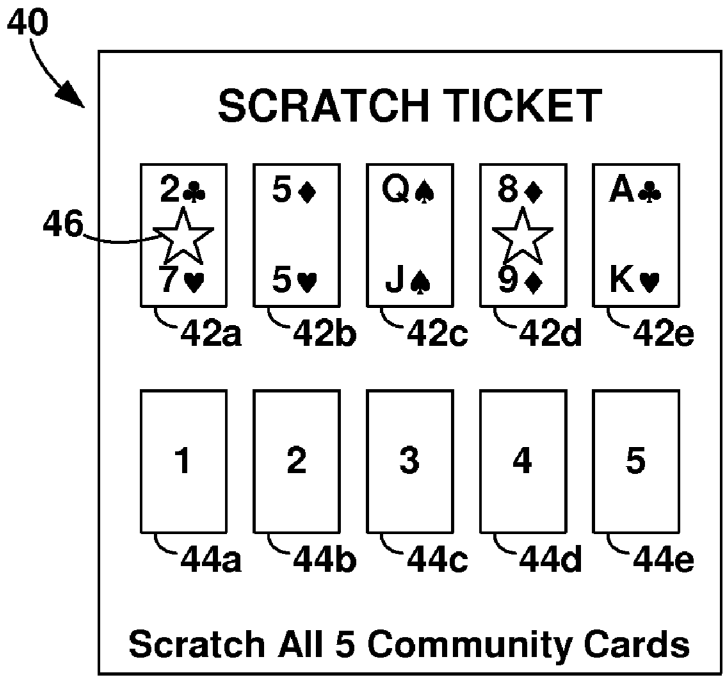
FIG. 10 shows a probability scratch ticket implementing the basic game of the present invention.

An example of a probability scratch ticket 40 of the present invention is shown in FIG. 10. The ticket 40 is produced with a number of two-card starter hands 42*a*-42*e* revealed and with a scratch location 44*a*-44*e* for each of the community cards. The community cards are selected randomly or otherwise prior to or during ticket printing. The player pays for the ticket and selects one or more hands to be played. The ticket 40 is marked to show the selection(s) prior to playing the ticket. In the example ticket 40 of FIG. 10, the two selected hands are marked with a star 46. The player scratches to reveal the community cards 44*a*-44*e*. The ticket is a winning ticket if the player selected the winning hand or a hand in a pay table.

Figure 11:
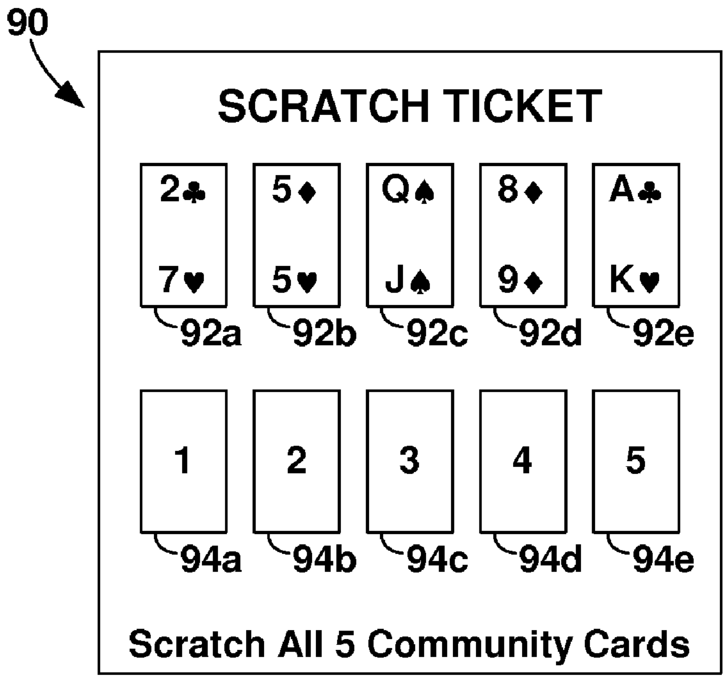
FIG. 11 shows a traditional scratch ticket implementing the basic game of the present invention.
Figures 12, 13, 14:
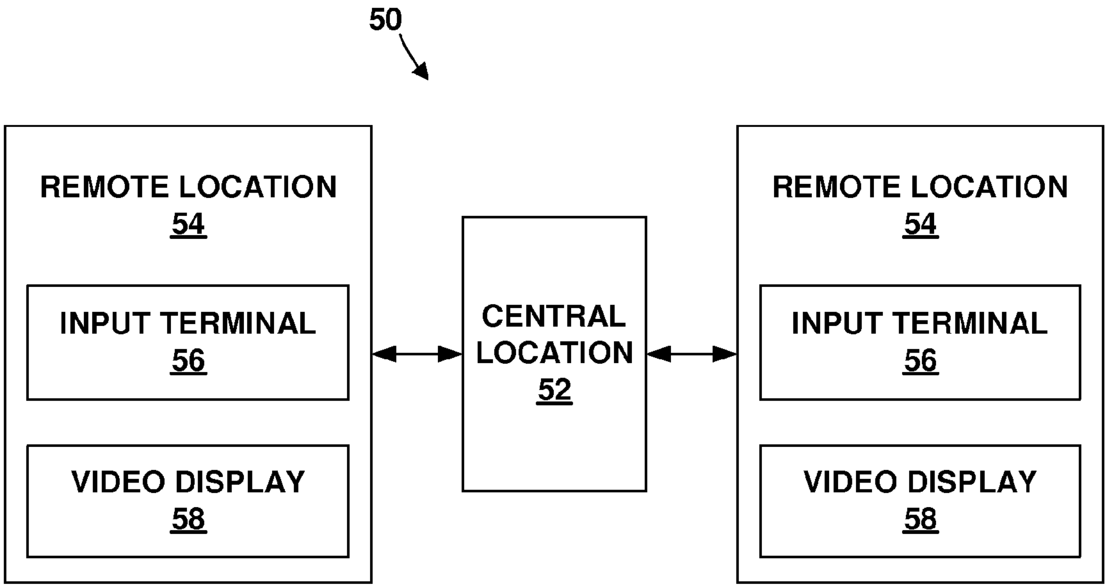
FIG. 12 is an example pay table for the scratch ticket of FIG. 11.
FIG. 13 is another example pay table for the scratch ticket of FIG. 11.
FIG. 14 shows a block diagram of a keno-style system implementing the basic game of the present invention.

An example of a traditional scratch ticket 90 of the present invention is shown in FIG. 11. The player pays for and receives the ticket 90. The ticket 90 is produced with a number of two-card starter hands 92*a*-92*e* revealed and with a scratch location 94*a*-94*e* for each of the community cards. The community cards are selected prior to printing. The player scratches to reveal the community cards 94*a*-94*e*. The ticket is a winning ticket if any of the five hands that is a combination of the starter hands 92*a*-92*e* and the community cards 94*a*-94*ew* are in a pay table. If so, the player receives the amount shown in the pay table. Example pay tables are shown in FIGS. 12 and 13. Optionally, as with the basic game described above, the starter hands 92*a*-92*e* are the same for an entire series of tickets. Optionally, as with the basic game described above, each starter hand 92*a*-92*e* has a separate pay table.

Figure 15:
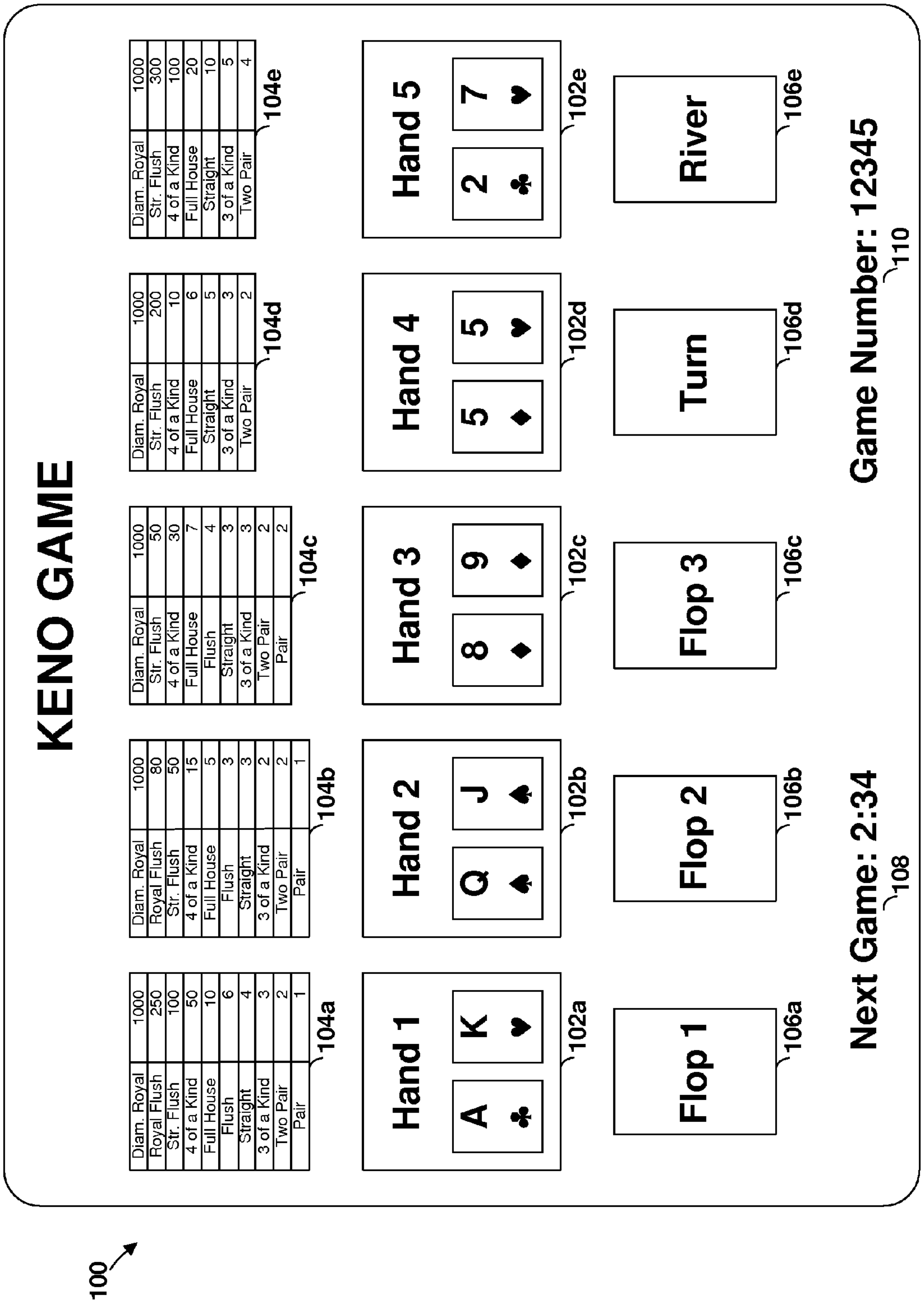
FIG. 15 shows a keno screen implementing an embodiment of the game of the present invention.
Figure 16:
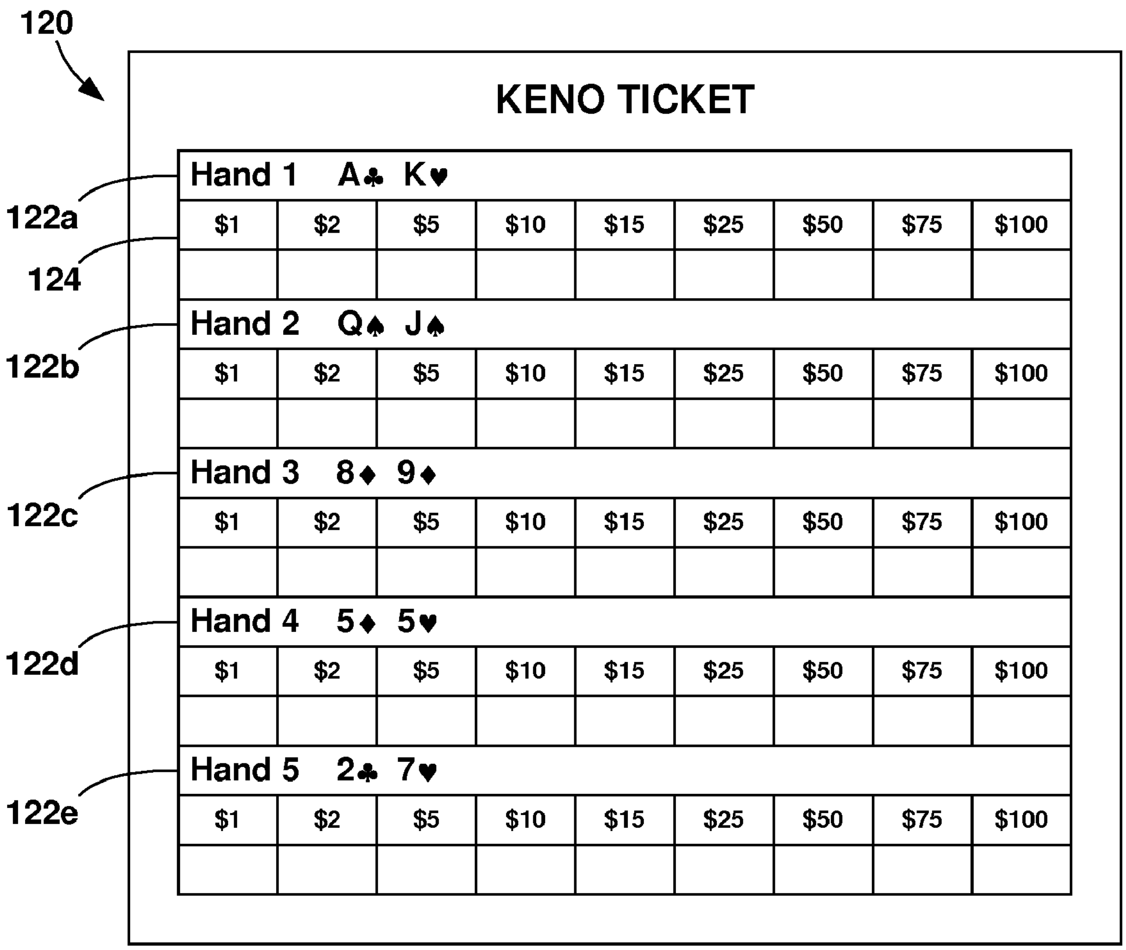
FIG. 16 shows an example ticket for use with the keno game of FIG. 15.
Figure 17:
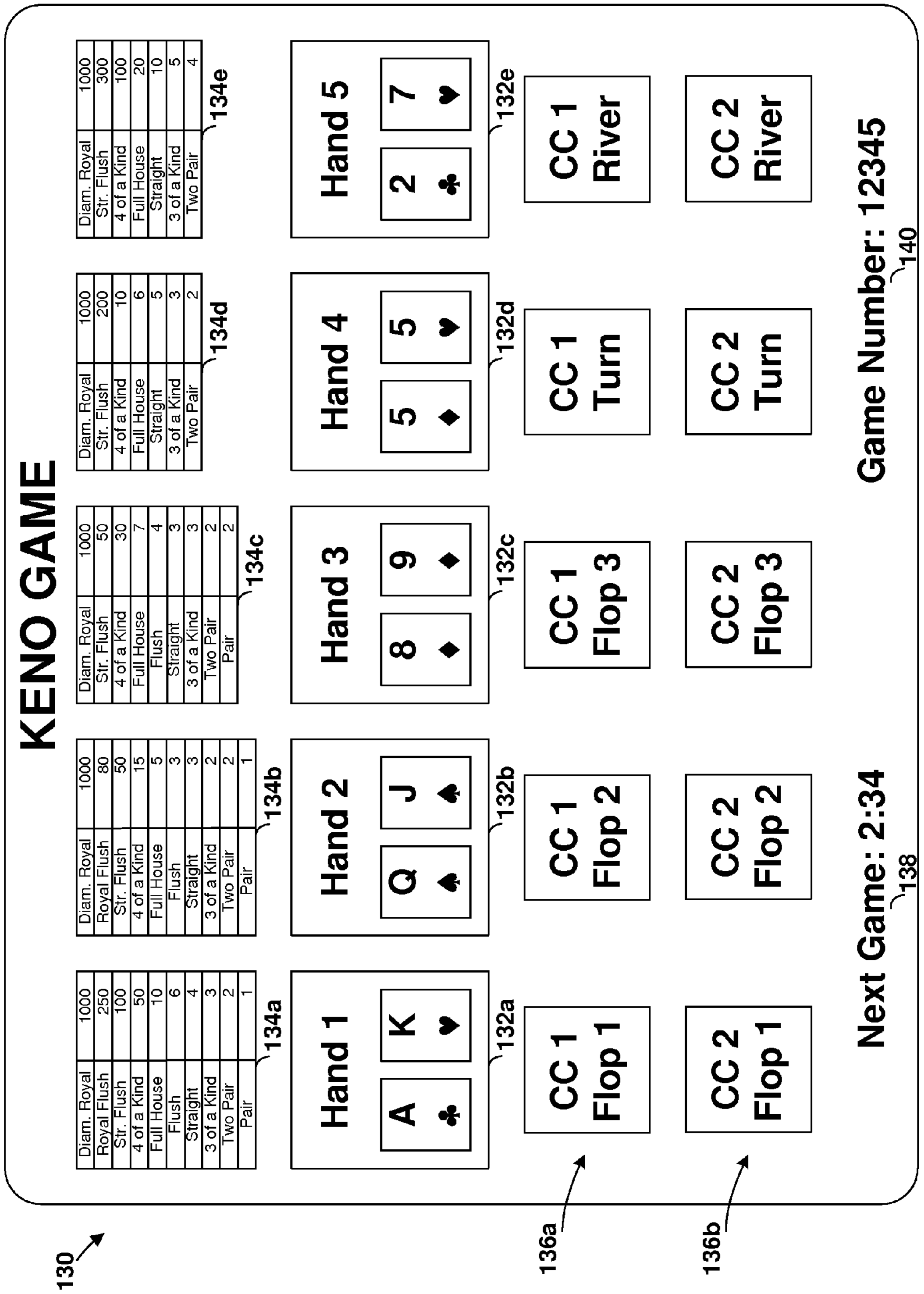
FIG. 17 shows a keno screen implementing another embodiment of the game of the present invention.

A block diagram 50 of a keno-style lottery system implementing the present invention is shown in FIG. 14 and example screens are shown in FIGS. 15 and 17. The screen 100 of FIG. 15 typically displays the two-card starter hands 102*a*-102*e*, a payout table 104*a*-104*e* for each hand, the community cards 106*a*-106*e*, a countdown until the next game 108, and the game number 110. A player typically makes her choice of hands 102*a*-102*e* at a remote location 54 by marking a slip of paper 120, an example of which is shown in FIG. 16, with the hands she wishes to wager on and the wager amount. The paper slip 120 has unique identifiers 122*a*-122*e* for each hand 102*a*-102*e* and, in the configuration of FIG. 16, a series of wager amounts 124 for each hand 102*a*-102*e*. Alternatively, the wager amount is a fixed amount for each hand chosen.

Figure 18:
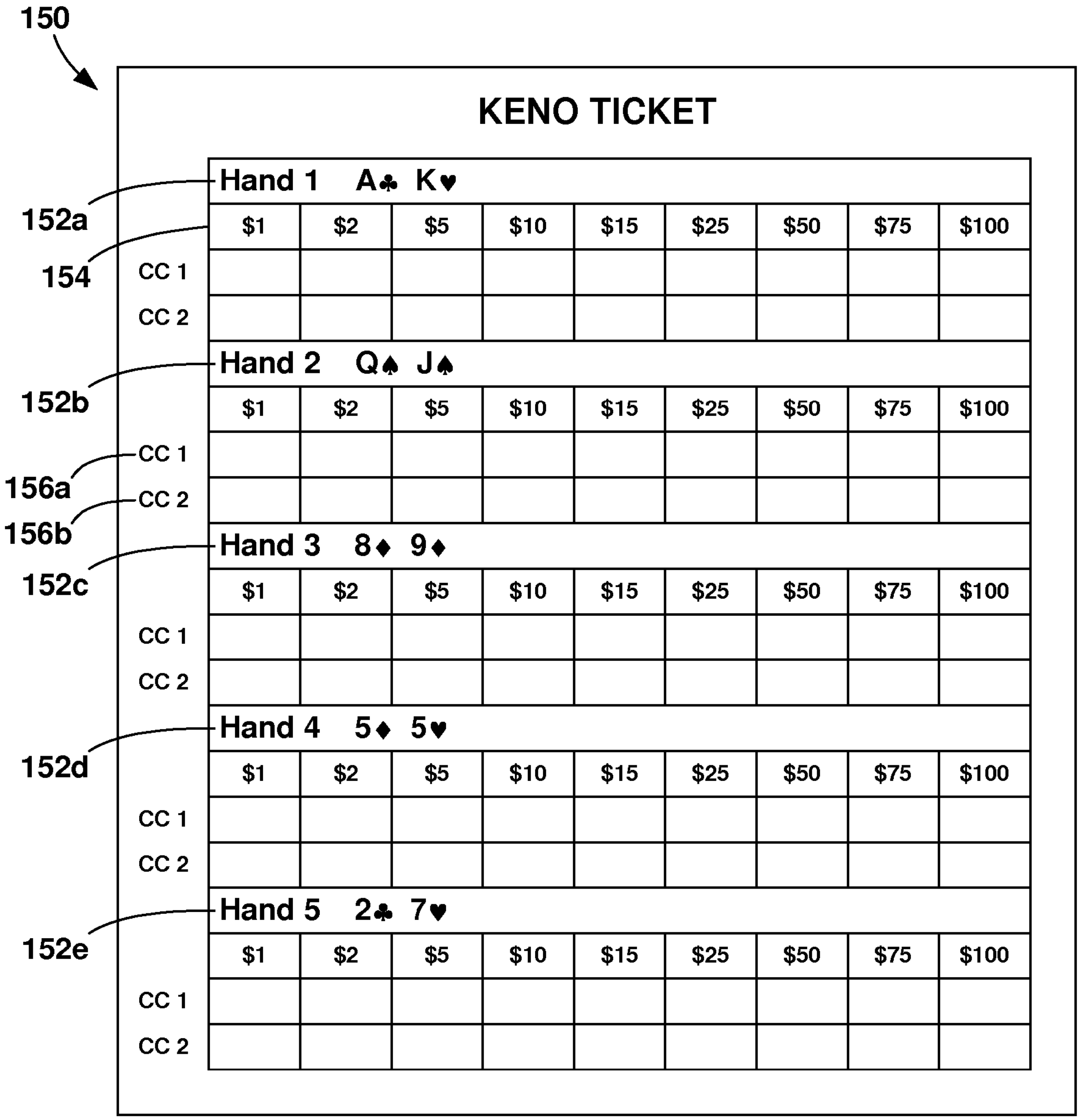
FIG. 18 shows an example ticket for use with the keno game of FIG. 17.

The screen 130 of FIG. 17 typically displays the two-card starter hands 132*a*-132*e*, a payout table 134*a*-134*e* for each hand, the sets of community cards 136*a*, 136*b*, a countdown until the next game 138, and the game number 140. A player typically makes her choice of hands 132*a*-132*e* and community card sets 136*a*, 136*b* at a remote location 54 by marking a slip of paper 150, an example of which is shown in FIG. 18, with the hands and community card sets she wishes to wager on and the wager amount. The paper slip 150 has unique identifiers 152*a*-152*e* for each hand 132*a*-132*e*, unique identifiers 156*a*, 156*b* for each community card set 136*a*, 136*b*, and, in the configuration of FIG. 18, a series of wager amounts 154 for each hand 132*a*-132*e* in combination with each community card set.

The player gives the marked paper slip 120, 150 to a clerk with the amount of the wager in cash or other acceptable alternative, who then scans the slip into a terminal 56 that sends the choices to a central location 52. Alternatively, hand and wager choices can be made electronically such as by keys on a keyboard, keys on a keypad, locations on a touch screen, etc., rather than by a paper slip 120, 150. Alternatively, the player many choose hands by requesting a "quick pick," where the input terminal 56 or central location 52 randomly chooses a hand or hands for the player. The player receives a receipt, such as a paper receipt, or other acknowledgement, such as an indication on a private terminal, indicating the hand or hands chosen for the game and the game number.

Using the screen 100 of FIG. 16 to complete the example, at the appropriate time, such as when the countdown 108 reaches zero, randomly-selected community cards 106*a*-106*e* are displayed on a video screen 100 or matrix of video screens visible to the players at the remote location 54 from information received from the central location 52. The community cards 106*a*-106*e* can be displayed one at a time, all at once, or in subset combinations. In one such combination, the flop 106*a*-106*c* is revealed first, followed by the turn card 106*d*, and then the river card 106*e*. After the community cards 106*a*-106*e* are revealed, a player having selected a hand that has a combination shown in the corresponding payout table 104*a*-104*e* is a winner.

The above-described keno system is but one form of keno system. In another form, the player is provided with an individual terminal, such as a hand-held terminal, a floor terminal, or a kiosk, that displays the hands and community cards and that permits a player to make hand selections and wagers. The individual terminals may be linked, either physically or electronically. In yet another form of system, the player plays via a personal computer on a network, such as the Internet, or via a mobile telephone or PDA.

As described above, the keno-type game can include bonus side bets. In one such side bet, the player wagers that a hand composed of the flop 106*a*-106*c* is found in a pay table. In another such side bet, the player wagers that a hand composed of all of the community cards 106*a*-106*e* is found in a pay table.

Figure 19:
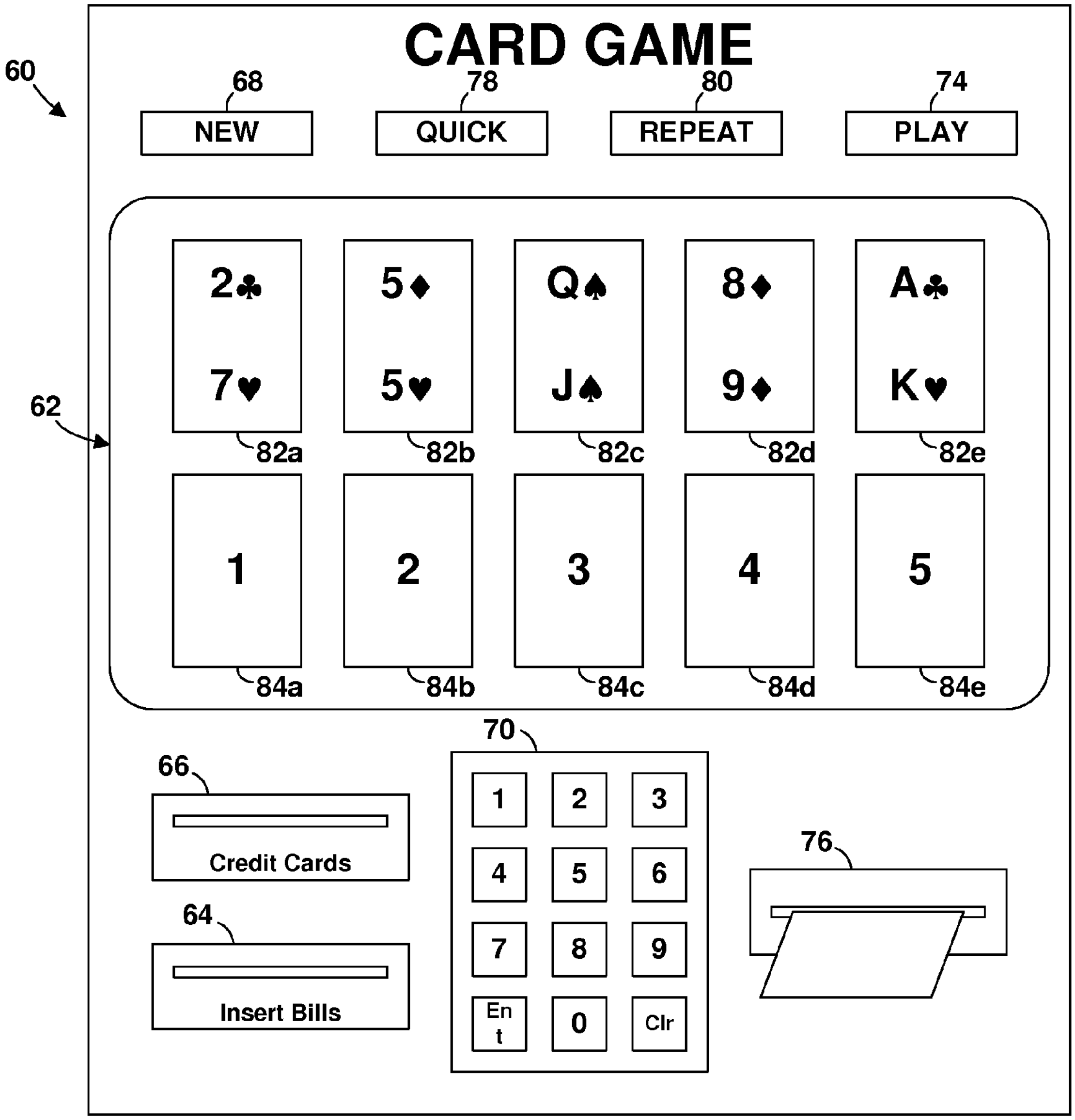
FIG. 19 shows a video screen implementing the basic game of the present invention.
Figure 20:
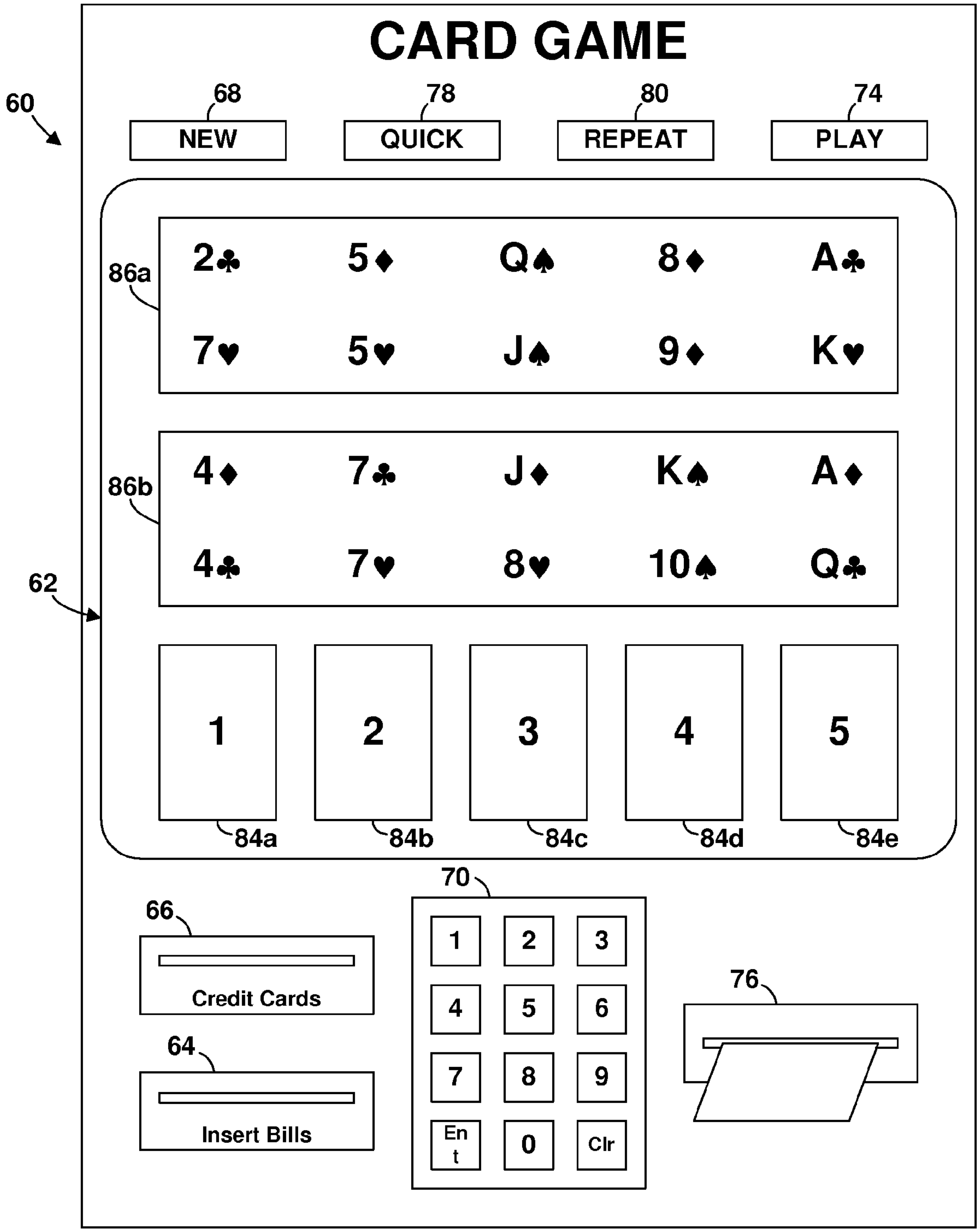
FIG. 20 shows a video screen implementing another embodiment of the game of the present invention.
Figure 21:
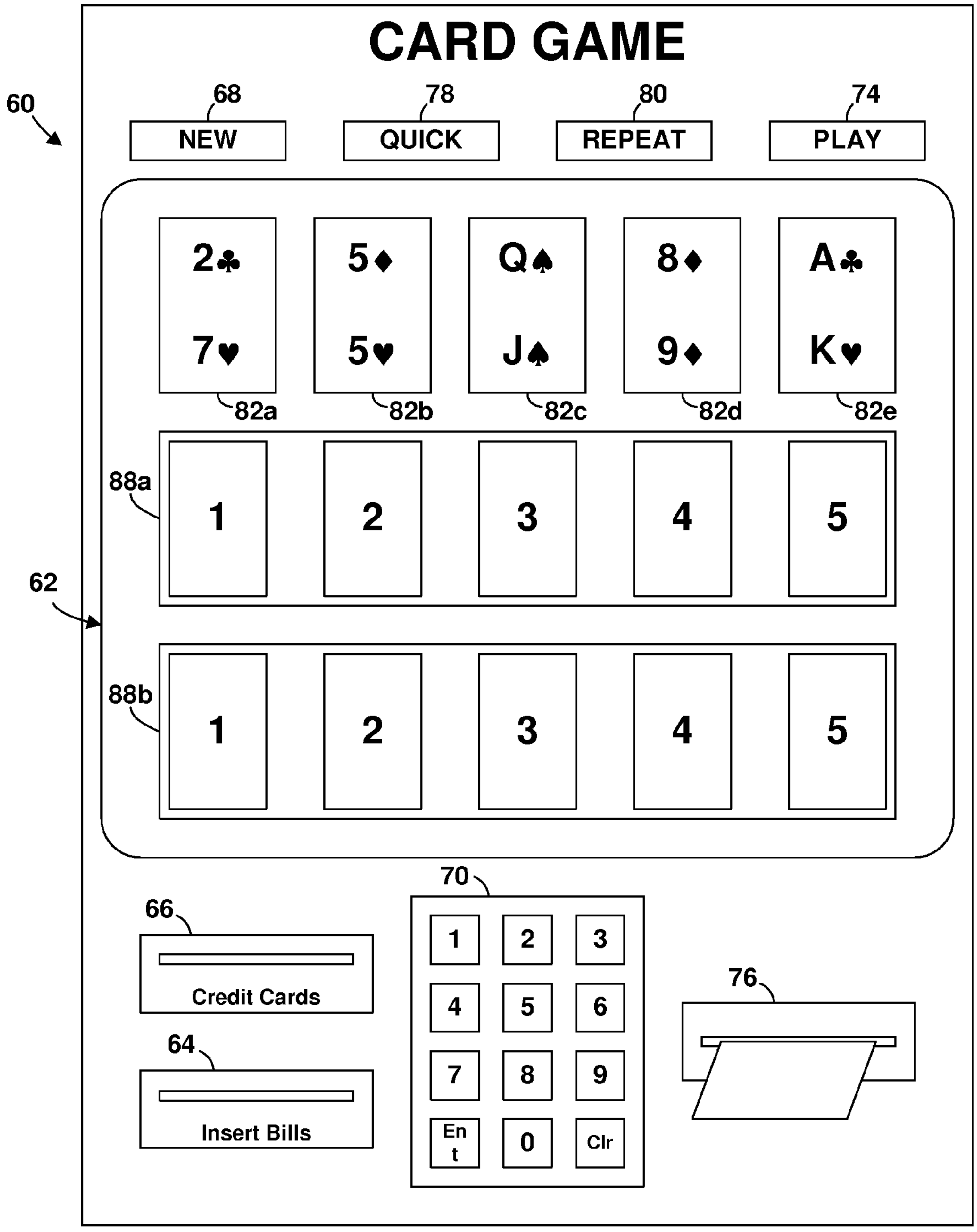
FIG. 21 shows a video screen implementing another embodiment of the game of the present invention.

Examples of individual machines are shown in FIGS. 19-21. Each player has her own terminal 60, an example of which is a video machine at a gaming establishment. Prior to playing a game, the player inserts cash, a voucher, or a paper ticket, into a money reader 64 or swipes a credit card, debit card, or player card in a card reader 66. The player begins a game by pressing the NEW button 70 and entering either the hands 82*a*-82*e* on which the player wishes to wager, as in FIG. 19, the set of hands 86*a*, 86*b* on which the player wishes to wager, as in FIG. 20, and/or the set of community cards 88*a*, 88*b* on which the player wishes to wager, as in FIG. 21. The player then enters the amount to wager using the keypad 70 or a touch screen 62. The player presses the PLAY button 74 to reveal the first three community cards 84*a*-84*c* in the embodiments of FIGS. 17 and 18 or the first three community cards of the selected set(s) 88*a*, 88*b* in the embodiment of FIG. 21. The player can either fold, check, or raise each of the previously selected hands. The player presses the PLAY button 74 again to reveal the last two community cards 84*d*, 84*e* and to determine if the player won. Winning amounts are credited to the player and may be printed on a voucher 76 for payment by a cashier or they may be paid in coins or other monetary tokens by the terminal itself. Optionally, the terminal 60 may include a QUICK button 78 to provide the player with a "quick pick" option, and/or a REPEAT button 80 so that the player may repeat the selections from the previous game.

The present invention contemplates that more than one game can be play simultaneously on a machine. For example, two sets of starter hands a set of community cards for each set of starter hands may be displayed for simultaneous, independent play on a single machine.

Alternatively, the standalone machine may be a personal computer, hand-held device, mobile telephone, or PDA. The standalone machine can be part of a wired or wireless network. Wagers can be made by debits to credit cards, debit cards, or other cash equivalent. Payouts can be made by crediting credit cards, debit cards, or other bank account, by dispatching gifts, or by any other method wherein the player is credited with the amount won.

Thus, it has been shown and described a poker-type scratch ticket game that satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

I claim:

1. A method of playing a succession of poker-type keno games with at least one 52-card deck of playing cards, said method comprising the steps of:

(a) providing a plurality of starter hands each having at least one predetermined, revealed playing card;

(b) removing said revealed playing cards from said deck; and (c) providing a separate payout table corresponding to each of said starter hands;

(d) playing said poker-type game a plurality of times in succession, said game comprising the steps of: (1) providing a set of community cards comprised of a plurality of playing cards, said set of community cards being combined with each of said starter hands to produce a complete hand corresponding to each starter hand; (2) a player wagering on one or more of said starter hands, said corresponding complete hands being wagered hands; (3) revealing said community cards after said wagering; (4) determining if any of said wagered hands has a predetermined combination found in said corresponding payout table; and (5) paying said player a payout amount if at least one of said wagered hands has said predetermined combination;

(e) whereby said starter hands remain the same for each of said games of said succession of games.

2. The method of claim 1 wherein said corresponding payout table is comprised of predetermined combinations and payout amounts that are based on the odds of said starter hand achieving particular ranked hands.

3. The method of claim 1 wherein said starter hand cards are revealed on a paper slip and said player wagers on said starter hands by marking said paper slip.

4. The method of claim 1 wherein said starter hand cards are revealed on a video screen and said player wagers on said starter hands electronically.

5. The method of claim 1 wherein said community cards are revealed on a video screen.

6. The method of claim 1 wherein said starter hand has two playing cards and said set of community card has five playing cards.

7. The method of claim 1 wherein said player is given the option of having said wagered hands chosen randomly.

8. The method of claim 1 further comprising providing a plurality of sets of community cards and combining each of said starter hands with each of said sets of community cards.

9. The method of claim 8 wherein said player wagers on one or more of said sets of community cards.

10. The method of claim 8 wherein said player wagers on all of said sets of community cards.

11. The method of claim 1 wherein said player is required to wager on all of said starter hands.

* * * * *